US008993677B2

(12) United States Patent
Mitadera et al.

(10) Patent No.: US 8,993,677 B2
(45) Date of Patent: Mar. 31, 2015

(54) REACTIVE POLYAMIDE RESINS AND POLYAMIDE RESIN COMPOSITIONS

(75) Inventors: Jun Mitadera, Kanagawa (JP); Shinichi Ayuba, Kanagawa (JP); Nobuhiko Matsumoto, Kanagawa (JP); Kosuke Otsuka, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/809,499

(22) PCT Filed: May 18, 2012

(86) PCT No.: PCT/JP2012/062814
§ 371 (c)(1),
(2), (4) Date: Jan. 10, 2013

(87) PCT Pub. No.: WO2012/169334
PCT Pub. Date: Dec. 13, 2012

(65) Prior Publication Data
US 2013/0123439 A1 May 16, 2013

(30) Foreign Application Priority Data

Jun. 10, 2011 (JP) ................. 2011-129969

(51) Int. Cl.
C08L 77/00 (2006.01)
C08L 77/06 (2006.01)
C08G 69/26 (2006.01)
C08K 7/14 (2006.01)

(52) U.S. Cl.
CPC .................. *C08G 69/26* (2013.01); *C08L 77/06* (2013.01); *C08K 7/14* (2013.01)
USPC ............ 525/178; 525/66; 525/92 B; 525/179; 525/183; 525/184

(58) Field of Classification Search
USPC ......... 525/66, 92 B, 178, 179, 183, 184, 420, 525/424, 431
See application file for complete search history.

(56) References Cited

U.S. PATENT DOCUMENTS

| 3,946,089 | A * | 3/1976 | Furukawa et al. ............ 525/408 |
| 6,239,233 | B1 * | 5/2001 | Bell et al. ....................... 525/425 |
| 8,603,600 | B2 * | 12/2013 | Mitadera et al. ............ 428/35.7 |
| 2010/0120961 | A1 | 5/2010 | Tanaka et al. |
| 2012/0128532 | A1 * | 5/2012 | Kashiba et al. ................ 422/40 |
| 2013/0066041 | A1 | 3/2013 | Mitadera et al. |
| 2013/0123439 | A1 | 5/2013 | Mitadera et al. |

FOREIGN PATENT DOCUMENTS

| EP | 2 025 718 A1 | 2/2009 |
| EP | 2 444 458 | 4/2012 |
| GB | 1321167 | * 6/1973 |
| JP | 63-137956 | 6/1988 |
| JP | 2000-211665 | 8/2000 |
| JP | 2003-11307 | 1/2003 |
| JP | 2004-210997 | 7/2004 |
| JP | 2004-237570 | 8/2004 |
| JP | 2007-31475 | 2/2007 |
| JP | 2009-269952 | 11/2009 |
| JP | 2010-253803 | 11/2010 |
| JP | 2011-80034 | 4/2011 |
| JP | 2011-89007 | 5/2011 |
| JP | 2011-94021 | 5/2011 |
| KR | 10-2011-0056395 A | 5/2011 |
| TW | 200909477 A | 3/2009 |
| TW | 201016748 A1 | 5/2010 |
| TW | 201020274 A1 | 6/2010 |
| WO | 2010-147097 | 12/2010 |
| WO | 2012/005204 | * 1/2012 |
| WO | WO 2012/046629 A1 | 4/2012 |

OTHER PUBLICATIONS

Office Action issued on Mar. 5, 2013 in the corresponding Taiwanese patent Application No. 101120532 (with English Translation).
U.S. Appl. No. 13/702,865, filed Dec. 7, 2012, Mitadera, et al.
International Search Report and Written Opinion issued Jul. 10, 2012, in PCT/JP2012/062814 (with English-language translation).
U.S. Appl. No. 13/824,027, filed Mar. 15, 2013, Mitadera, et al.
U.S. Appl. No. 13/822,152, filed Mar. 11, 2013, Mitadera, et al.
Korean Office Action Issued Mar. 21, 2013 in Patent Application No. 10-2012-7034200 (with English translation).
U.S. Appl. No. 13/885,444, filed May 15, 2013, Mitadera.
B. A. Zhubanov, et al.; "Kinetics of Polyamidation in the Melt"; Polymer Science U.S.S.R, Pergamon, vol. 12; No. 10, Jan. 1, 1970, pp. 2636-2642.
Office Action issued Jan. 3, 2014 in Chinese Patent Application No. 201280002702.2 (with English translation).
Extended European Search Report issued Dec. 6, 2013, in European Patent Application No. 12797078.8.
International Preliminary Report on Patentability issued Dec. 27, 2013, in Application No. PCT/JP2012/062814.
Chinese Office Action dated Sep. 3, 2013, in Chinese Patent Application No. 201280002702.2 (with English translation).
Combined Chinese Office Action and Search Report issued Apr. 29, 2014 in Patent Application No. 201280002702.2 (with English translation of categories of cited documents).

* cited by examiner

*Primary Examiner* — Ana Woodward
(74) *Attorney, Agent, or Firm* — Oblon, McClelland, Maier & Neustadt, L.L.P.

(57) ABSTRACT

Provided is a polyamide resin composition comprising an elastomer etc, and a reactive polyamide resin excellent in reactivity. The polyamide resin composition comprises 0.5 to 100 parts by mass of an elastomer per 100 parts by mass of a reactive polyamide resin, wherein the reactive polyamide resin obtained by polycondensing a diamine (A) containing 70 mol % or more of a diamine structural unit derived from xylylenediamine and a dicarboxylic acid (B) containing 50 mol % or more of a dicarboxylic acid structural unit derived from sebacic acid, and has a concentration of reactive functional groups of 100 μeq/g or more and a molar ratio of reacted diamine to reacted dicarboxylic acid (the number of moles of reacted diamine/the number of moles of reacted dicarboxylic acid) of 1.0 or more.

13 Claims, No Drawings

REACTIVE POLYAMIDE RESINS AND POLYAMIDE RESIN COMPOSITIONS

TECHNICAL FIELD

The present invention relates to reactive polyamide resins and polyamide resin compositions, specifically reactive polyamide resins having a low yellowness index (YI) and a reduced increase in YI after heating.

It also relates to reactive polyamide resins highly reactive with elastomers and the like and polyamide resin compositions containing such a polyamide resin and an elastomer.

BACKGROUND ART

Polyamide resins are widely used as engineering plastics having excellent mechanical strength such as impact resistance and friction/abrasion resistance as well as excellent heat resistance and oil resistance in the fields of automotive parts, electronic/electric equipment parts, office automation equipment parts, machine parts, construction materials/housing parts and the like, and recently have found increasingly wide applications.

Many classes of polyamide resins including e.g., polyamide 6 and polyamide 66 are known, among which m-xylylene adipamide (hereinafter sometimes referred to as "MXD6") derived from m-xylylenediamine and adipic acid is positioned as a very excellent polyamide resin because it contains an aromatic ring in the main chain unlike polyamide 6 and polyamide 66 so that it has high rigidity, low water absorption and excellent oil resistance as well as a low shrinkage ratio during molding and causes little shrinkage or warp, which means that it is also suitable for precision molding. Thus, MXD6 has recently been more widely used as a molding material, especially extrusion molding material in various fields including electronic/electric equipment parts, parts of vehicles such as automobiles, general machine parts, precision machine parts, leisure/sports goods, civil engineering and construction materials, etc.

Lighter and stronger polyamide resin materials are also needed and a known xylylene polyamide resin lighter than MXD6 includes a xylylene sebacamide polyamide resin derived from xylylenediamine and sebacic acid (hereinafter sometimes referred to as "XD10") (see patent document 1), which has been highly expected as a material for various parts because of its excellent chemical resistance and impact resistance especially in recent years.

On the other hand, various methods for melt-blending MXD6 with other polyamide resins having high flexibility such as polyamide 6 and polyamide 66 have been proposed to meet increasingly growing commercial needs of recent years in applications requiring high impact resistance or flexibility (e.g., see patent documents 2 and 3). However, the melt viscosity may increase above the arithmetic mean when a polyamide resin containing an m-xylylene group is melt-blended with another polyamide resin. As a means for avoiding this phenomenon, a polyamide resin having a terminal group ratio of carboxyl groups in excess over amide groups has been proposed to prevent the progress of amidation in the molten state (patent document 4). Especially for the purpose of preventing gelling of MXD6, polyamide resins having a low amino group concentration have been proposed. For the purpose of improving the flexibility of MXD6, a polyamide having a specific difference between the carboxyl group concentration and the amino group concentration has also been proposed by copolymerizing ε-caprolactam (patent document 5), but it was insufficient in physical properties for use in injection molding.

Incorporation of an elastomer into MXD6 or XD10 for the purpose of increasing elongation may be a promising means for providing high impact resistance or flexibility. However, simple incorporation of an elastomer into XD10 disadvantageously tends to cause insufficient dispersion of XD10 and the elastomer, which may result in a decrease in the intrinsic rigidity or impact resistance.

Thus, there have been high demands for developing XD10 polyamide resins capable of achieving high impact resistance and high flexibility by simply adding an elastomer.

Further, polyamide resins are required to have a low YI. Especially, an increase in YI after heating should be reduced.

REFERENCES

Patent Documents

Patent document 1: JPA S63-137956;
Patent document 2: JPA 2000-211665;
Patent document 3: JPA 2003-11307;
Patent document 4: JPA 2007-31475;
Patent document 5: JPA 2011-89007.

SUMMARY OF THE INVENTION

Problems to be Solved by the Invention

An object of the present invention is to solve the above problems and to provide XD10 having a low YI and capable of reducing an increase in YI after heating. Another object is to provide XD10 capable of achieving high impact resistance and flexibility by adding an elastomer while retaining excellent properties intrinsic to XD10.

Means for Solving the Problems

As a result of careful studies to attain the above objects, we accomplished the present invention on the basis of the finding that reactive XD10 polyamide resins having a reactive functional group concentration as high as 100 or more and containing excessive amino groups as shown by a molar ratio of reacted diamine to reacted dicarboxylic acid (the number of moles of reacted diamine/the number of moles of reacted dicarboxylic acid) of 1.0 or more exhibit a low YI and a reduced increase in YI even after heating. We also found that excellent impact resistance and flexibility can be conferred on such reactive XD10 polyamide resins by elastomers.

[1] A reactive polyamide resin obtained by polycondensing a diamine (A) containing 70 mol % or more of a diamine structural unit derived from xylylenediamine and a dicarboxylic acid (B) containing 50 mol % or more of a dicarboxylic acid structural unit derived from sebacic acid, wherein the reactive polyamide resin has a concentration of reactive functional groups of 100 μeq/g or more and a molar ratio of reacted diamine to reacted dicarboxylic acid (the number of moles of reacted diamine/the number of moles of reacted dicarboxylic acid) of 1.0 or more.

[2] The reactive polyamide resin according to [1], wherein the reactive functional groups are located at the ends of the polyamide resin.

[3] The reactive polyamide resin according to [1] or [2], wherein the reactive functional groups are a carboxyl group and/or an amino group.

[4] The reactive polyamide resin according to [3], which has an amino group concentration of 50 µeq/g or more.
[5] The reactive polyamide resin according to any one of [1] to [4], which has a number average molecular weight of 20,000 or less.
[6] The reactive polyamide resin according to any one of [1] to [5], wherein the xylylenediamine is m-xylylenediamine or p-xylylenediamine.
[7] The reactive polyamide resin according to any one of [1] to [5], wherein the xylylenediamine is a mixture of m-xylylenediamine and p-xylylenediamine.
[8] The reactive polyamide resin according to any one of [1] to [7], wherein the reaction molar ratio is 1.015 or less.
[9] The reactive polyamide resin according to any one of [1] to [8], wherein the reactive functional groups are a carboxyl group and an amino group located at the ends of the polyamide resin and the reactive polyamide resin has a terminal amino group concentration of 50 µeq/g or more.
[10] A polyamide resin composition, comprising 0.5 to 100 parts by mass of an elastomer per 100 parts by mass of a reactive polyamide resin according to any one of [1] to [9].
[11] The polyamide resin composition according to [10], wherein the elastomer is selected from polyolefin elastomers, diene elastomers, polystyrene elastomers, polyamide elastomers, polyester elastomers, polyurethane elastomers and silicone elastomers or a functionalized form thereof.

Advantages of the Invention

The present invention made it possible to provide polyamide resins having a low YI and capable of reducing an increase in YI after heating. The polyamide resins of the present invention also have high reactivity with elastomers so that their impact resistance and flexibility can be very effectively improved by elastomers. Further, molded articles obtained by using resin compositions comprising a polyamide resin of the present invention and an elastomer are excellent in impact resistance and flexibility as well as heat resistance, strength and various mechanical properties so that they can be conveniently used as injection moldings, films, sheets, tubes, hoses, threads, fibers and the like in various applications including films, sheets, laminated films, laminated sheets, tubes, hoses, pipes, various containers such as hollow containers and bottles, various parts/members, industrial resources, industrial materials and domestic goods. The polyamide resins of the present invention can be used as parts or the like in which they are injection-molded or laminated on metals or coextruded on metal plates or coated on metal tubes.

THE BEST MODE FOR CARRYING OUT THE INVENTION

1. Summary of the Invention

The polyamide resins of the present invention are reactive polyamide resins obtained by polycondensing a diamine (A) containing 70 mol % or more of a diamine structural unit derived from xylylenediamine and a dicarboxylic acid (B) containing 50 mol % or more of a dicarboxylic acid structural unit derived from sebacic acid, characterized in that they have a reactive functional group concentration of 100 µeq/g or more and a molar ratio of reacted diamine to reacted dicarboxylic acid (the number of moles of reacted diamine/the number of moles of reacted dicarboxylic acid) of 1.0 or more.

The present invention will now be explained in detail below.

2. Polyamide Resins

The polyamide resins of the present invention are reactive polyamide resins obtained by polycondensing a diamine (A) containing 70 mol % or more of a diamine structural unit (diamine-derived structural unit) derived from xylylenediamine and a dicarboxylic acid (B) containing 50 mol % or more of a dicarboxylic acid structural unit (dicarboxylic acid-derived structural unit) derived from sebacic acid.

The diamine unit forming part of the polyamide resins of the present invention must contain 70 mol % or more, preferably 80 mol % or more, more preferably 90 mol % or more of a xylylenediamine unit. The polyamide resins can exhibit excellent elastic modulus by containing 70 mol % or more of a xylylenediamine unit in the diamine unit.

Xylylenediamines preferably used include m-xylylenediamine, p-xylylenediamine and mixtures thereof. The melting point and glass transition point, heat resistance and crystallization rate of the polyamide resins can be improved by combining m-xylylenediamine with p-xylylenediamine as diamine components.

For the purpose of improving the crystallization rate of the polyamide resins, p-xylylenediamine in the diamine structural unit is preferably 20 mol % or more, more preferably 30 mol % or more, even more preferably 40 mol % or more, especially preferably 60% or more.

Examples of compounds that can constitute diamine units other than m-xylylenediamine and p-xylylenediamine units may include, but not limited to, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decane and bis(aminomethyl)tricyclodecane; and diamines having an aromatic ring such as bis(4-aminophenyl)ether, p-phenylenediamine and bis(aminomethyl)naphthalene, etc.

On the other hand, 50 mol % or more of the dicarboxylic acid structural unit forming part of the polyamide resins of the present invention must be derived from sebacic acid. If the structural unit derived from sebacic acid is less than 50 mol % in the dicarboxylic acid structural unit, the polyamide resins have high moisture content and high water absorption (hygroscopy). They also have high density so that the resulting moldings have large weights. A decrease in elastic modulus due to water absorption by the polyamide resins can be reduced by including 50 mol % or more of a structural unit derived from sebacic acid. Higher proportions of the structural unit derived from sebacic acid allow weight reduction. The structural unit derived from sebacic acid in the dicarboxylic acid structural unit is preferably 75 to 100 mol %, more preferably 90 to 100 mol %.

Such sebacic acid is preferably derived from a plant. Polyamide resins containing sebacic acid derived from a plant as a structural unit resist yellowing without adding any antioxidant and the resulting moldings also have a low YI because plant-derived sebacic acid contains impurities such as sulfur compounds and sodium compounds. Plant-derived sebacic acid is preferably used without excessively purifying impurities. The elimination of the necessity of excessive purification is also advantageous in terms of cost.

Sebacic acid here preferably has a sulfur atom concentration of 1 to 200 ppm, more preferably 10 to 150 ppm, especially preferably 20 to 100 ppm. When it is in the above ranges, the increase in YI can be reduced during the synthesis of the polyamide resins. The increase in YI during melt molding of the polyamide resins can also be reduced so that the YI of the resulting moldings can be decreased.

Moreover, sebacic acid preferably has a sodium atom concentration of 1 to 500 ppm, more preferably 10 to 300 ppm, especially preferably 20 to 200 ppm. When it is in the above ranges, the polyamide resins are synthesized with good reactivity and readily controlled in an appropriate molecular weight range. Moreover, the increase in viscosity during melt molding of the polyamide resins can be reduced so that moldability improves and char can be prevented during molding, whereby the resulting moldings tend to have good quality. Additionally, the polyamide resins tend to be less likely deposited as degraded resins on a die when they are compounded with glass fillers or the like.

The purity of plant-derived sebacic acid is preferably 99 to 100% by mass, more preferably 99.5 to 100% by mass, even more preferably 99.6 to 100% by mass. These ranges are preferred, because the resulting polyamide resins have good quality and polymerization is not affected.

For example, the amount of dicarboxylic acids such as 1,10-decamethylenedicarboxilic acid contained in sebacic acid is preferably 0 to 1% by mass, more preferably 0 to 0.7% by mass, even more preferably 0 to 0.6% by mass. These ranges are preferred, because the resulting polyamide resins have good quality and polymerization is not affected.

The amount of monocarboxylic acids such as octanoic acid, nonanoic acid and undecanoic acid contained in sebacic acid is preferably 0 to 1% by mass, more preferably 0 to 0.5% by mass, even more preferably 0 to 0.4% by mass. These ranges are preferred, because the resulting polyamide resins have good quality and polymerization is not affected.

Hue (APHA) of sebacic acid is preferably 100 or less, more preferably 75 or less, even more preferably 50 or less. These ranges are preferred, because the resulting polyamide resins have a low YI. As used herein, APHA can be determined by Standard Methods for the Analysis of Fats, Oils and Related Materials defined by Japan Oil Chemist's Society.

Dicarboxylic acid components other than sebacic acid that can be used for the preparation of the polyamide resins preferably include dicarboxylic acid components based on other straight chain aliphatic α,ω-dicarboxylic acids containing 4 to 20 carbon atoms, e.g., aliphatic dicarboxylic acids such as adipic acid, succinic acid, glutaric acid, pimelic acid, suberic acid, azelaic acid, undecanoic diacid, dodecanoic diacid and the like.

Among them, adipic acid, undecanoic diacid, dodecanoic diacid and the like are preferably used as dicarboxylic acid components other than sebacic acid, if they are present, and adipic acid is especially preferred. Elastic modulus, water absorption and crystallinity can be readily controlled by additionally including adipic acid. The amount of adipic acid is more preferably 40 mol % or less, even more preferably 30 mol % or less.

Polyamide resins additionally containing undecanoic diacid or dodecanoic diacid are also preferred because they have lower specific gravity and the resulting moldings have lower weight. The proportion of straight chain aliphatic α,ω-dicarboxylic acids containing 4-20 carbon atoms other than sebacic acid is less than 50 mol %, preferably 40 mol % or less, if they are used.

Aromatic dicarboxylic acids such as terephthalic acid, isophthalic acid and 2,6-naphthalenedicarboxylic acid may also be used, and they may be used in combination.

In addition to the diamine components and dicarboxylic acid components, lactams such as ε-caprolactam and laurolactam or aliphatic aminocarboxylic acids such as aminocaproic acid and aminoundecanoic acid may also be used as components to be copolymerized to make up the polyamide resins so far as the benefits of the present invention are not affected.

The most preferred polyamide resins are poly(m-xylylene sebacamide) resins, poly(p-xylylene sebacamide) resins and mixed poly(m-xylylene/p-xylylene sebacamide) resins obtained by polycondensing a xylylenediamine mixture of m-xylylenediamine and p-xylylenediamine with sebacic acid. These polyamide resins tend to have especially good moldability.

The polyamide resins of the present invention must have a reactive functional group concentration of 100 µeq/g or more and a reaction molar ratio of 1.0 or more.

The reactive functional group concentration refers to the concentration (µeq/g) of reactive groups located at the ends and on the main chain or side chains of a polyamide resin, and the reactive groups are typically amino and carboxyl groups. Theoretically, the terminal reactive functional group concentration may be substantially equal to the total reactive functional group concentration of a polymer when reactive functional groups are located only at the ends of the polymer depending on the structure of starting monomers, and such an embodiment is preferred in the present invention. The presence of reactive functional groups at high concentrations of 100 µeq/g or more leads to remarkable improvements in impact resistance and flexibility because dispersibility is improved as a result of improvements in reactivity with elastomers, especially with functional groups attached to elastomers such as carboxyl groups or anhydride groups. Moreover, adhesion to metal surfaces is also improved. Thus, the polyamide resins of the present invention can also preferably be employed for applications in which a polyamide resin molding is complexed with a metal. To improve adhesion between a metal and a polyamide, it is preferable to increase reactivity of the metal surface by a known technique such as corona treatment or to form small irregularities on the surface before contacting the polyamide in the molten state with the metal surface. The reactive functional group concentration is preferably 130 µeq/g or more, more preferably 140 µeq/g or more, even more preferably 150 µeq/g or more, especially 160 µeq/g or more. The upper limit is preferably 250 µeq/g or less, more preferably 230 µeq/g or less, even more preferably 210 µeq/g or less, especially 200 µeq/g or less. Specifically in the present invention, the total concentration of terminal amino groups and terminal carboxyl groups in a polyamide resin is preferably within the above ranges of the reactive functional group concentration.

The polyamide resins of the present invention must have a reaction molar ratio, i.e. a molar ratio of reacted diamine to reacted dicarboxylic acid (the number of moles of reacted diamine/the number of moles of reacted dicarboxylic acid) of 1.0 or more. Molar ratios of 1.0 or more provide amino group-rich polyamide resins and high reactive functional group concentrations as described above allow improvements in impact resistance and flexibility. Moreover, reaction molar ratios in the above ranges help to effectively reduce an increase in YI even if the polyamide resins of the present invention are heated.

The reaction molar ratio (r) is preferably 1.001 or more, more preferably 1.003 or more, especially 1.005 or more, with the upper limit typically being 1.03 or less, more preferably 1.02 or less, especially preferably 1.015 or less. When it is in the above ranges, polyamide resins having good quality can be obtained because they have good reactivity during polymerization and are less likely to be deteriorated during polymerization.

The reaction molar ratio (r) here is determined by the equation below as described in the Journal of Industrial Chemistry, vol. 74, No. 7 (1971), pp. 162-167:

$$r=(1-cN-b(C-N))/(1-cC+a(C-N))$$

wherein:
a: $M_1/2$
b: $M_2/2$
c: 18.015 (the molecular weight of water (g/mol))
$M_1$: the molecular weight of the diamine (g/mol)
$M_2$: the molecular weight of the dicarboxylic acid (g/mol)
N: amino group concentration (eq/g)
C: carboxyl group concentration (eq/g).

It should be understood that when a polyamide resin is synthesized from monomers of a diamine component and a carboxylic acid component having different molecular weights, $M_1$ and $M_2$ are calculated depending on the proportions (molar ratios) of the starting monomers. It should also be understood that if the synthesis vessel is a completely closed system, the molar ratio of loaded monomers equals the reaction molar ratio, but the inlet molar ratio does not always equal the reaction molar ratio because the actual synthesizer cannot be a completely closed system. Moreover, the inlet molar ratio does not always equal the reaction molar ratio because loaded monomers may not completely react. Thus, the reaction molar ratio refers to the molar ratio of actually reacted monomers determined from the terminal group concentrations of a finished polyamide resin. N is preferably the terminal amino group concentration, and C is preferably the terminal carboxyl group concentration.

The polyamide resins of the present invention preferably have an amino group concentration (preferably a terminal amino group concentration, [NH$_2$]) of 50 µeq/g or more, more preferably 70 µeq/g or more, even more preferably 90 µeq/g or more, especially preferably 100 µeq/g or more. The upper limit is preferably 200 µeq/g or less, more preferably 160 µeq/g or less, even more preferably 150 µeq/g or less, especially preferably 130 µeq/g or less. According to the present invention, the reaction molar ratio is controlled as described above and the amino group concentration (preferably terminal amino group concentration) is controlled at 50 µeq/g or more, whereby an increase in YI can be more effectively reduced even if the polyamide resins of the present invention are heated. It has hitherto been thought that excessive amino groups in polyamide resins help to promote gelling and to increase YI while they stay molten, which results in poor heat resistance. However, it was surprisingly found that the increase in YI during heating can be reduced in the polyamide resins of the present invention containing excessive amino groups. The reason for this has not been sufficiently verified, but it is supposed that production of coloring matters is prevented or coloring matters produced react with terminal groups to prevent yellowing because 50 mol % or more of the dicarboxylic acid structural unit is derived from sebacic acid or because some terminal groups interact.

The polyamide resins of the present invention can preferably be employed for even applications in which they are used in a heated environment such as applications for e.g., LED reflectors, which require improved heat aging resistance and a reduced increase in YI during heating. The above ranges are also preferred in terms of adhesion to metal surfaces.

Further, the carboxyl group concentration (preferably terminal carboxyl group concentration, [COOH]) is preferably less than 100 µeq/g, more preferably 10 to 80 µeq/g, even more preferably 20 to 70 µeq/g, or 30 to 60 µeq/g.

The amino group concentration can be determined by dissolving 0.5 g of a polyamide resin in 30 ml of a phenol/methanol (4:1) mixed solution with stirring at 20 to 30° C. and titrating the solution with 0.01 N hydrochloric acid. Similarly, the carboxyl group concentration can be calculated as follows: 0.1 g of a polyamide resin is dissolved in 30 ml of benzyl alcohol at 200° C. and 0.1 ml of a phenol red solution is added in the range of 160° C. to 165° C. This solution is titrated with a titration solution of 0.132 g of KOH in 200 ml of benzyl alcohol (0.01 mol/l expressed as KOH content) until the endpoint is reached at which the color changes from yellow to red completely.

The reactive functional group concentration of the polyamide resins can be controlled by appropriately selecting reaction conditions such as the inlet molar ratio of starting dicarboxylic acid and diamine, reaction period, reaction temperature, the speed at which xylylenediamine is added dropwise, the pressure in the vessel, the timing of starting depressurization, the structure of the partial and total condensers, the type of fillers and holding temperature.

The reaction molar ratio (r) of the polyamide resins can also be controlled by appropriately selecting reaction conditions such as the inlet molar ratio of starting dicarboxylic acid and diamine, reaction period, reaction temperature, the speed at which xylylenediamine is added dropwise, the pressure in the vessel, the timing of starting depressurization, the structure of the partial and total condensers, the type of fillers and holding temperature.

When the polyamide resins are prepared by the so-called salt process, a reaction molar ratio of 1.0 or more may be achieved specifically by selecting a ratio of starting diamine/starting dicarboxylic acid components in this range and allowing the reaction to proceed sufficiently far, for example. In the case of a process involving continuous dropwise addition of a diamine to a molten dicarboxylic acid, it may be achieved by not only selecting a loading ratio in this range but also adding dropwise the diamine in excess of the target value while controlling the amount of the diamine to be refluxed during the dropwise addition of the diamine and removing the added diamine outside the reaction system. Specifically, the diamine in excess of the target value may be removed outside the system by controlling the temperature in the reflux column in an optimal range or appropriately controlling the shapes and amounts of packings in the packed column such as so-called Raschig rings, Lessing rings and saddles. Alternatively, unreacted diamine in excess of the target value can also be removed outside the system by shortening the reaction period after dropwise addition of the diamine. Further, unreacted diamine in excess of the target value can also be removed outside the system as appropriate by controlling the speed at which the diamine is added dropwise. These methods allow the reaction molar ratio to be controlled in a predetermined range even if the loading ratio is outside a desired range.

The polyamide resins are prepared by using any of previously known processes and polymerization conditions without limitation. During polycondensation of the polyamide resins, a small amount of a monoamine or monocarboxylic acid may be added as a molecular weight modifier. For example, the polyamide resins are prepared by heating a salt composed of a diamine component containing xylylenediamine and a dicarboxylic acid component containing sebacic acid under pressure in the presence of water to polymerize it in the molten state while removing the added water and condensed water. The polyamide resins can also be prepared by directly adding xylylenediamine to a dicarboxylic acid in the molten state to polycondense them at atmospheric pressure. In the latter case, polycondensation proceeds by continuously adding the diamine to the dicarboxylic acid while heating the reaction system to a reaction temperature not lower than the melting points of the oligoamide and polyamide produced to maintain the reaction system in a homogeneous liquid state.

The polyamide resins may also be polymerized in the solid phase after they are prepared by melt polymerization. They may be prepared by using any of previously known solid phase polymerization processes and polymerization conditions without limitation.

During the preparation of the polyamide resins, hypophosphite compounds (also known as phosphinate compounds or phosphonite compounds) or phosphite compounds (also known as phosphonate compounds) or the like are typically added as antioxidants (heat stabilizers) at the stage of polycondensation in the molten state or the stage of preparation of starting materials (aqueous nylon salt solutions) for the purpose of appropriately controlling the reaction speed of amidation reaction, improving processing stability during melt molding and preventing discoloration of the polyamide resins. These phosphate antioxidants are oxidized into phosphorous acid salts or phosphoric acid salts so that oxygen is removed from the polyamide resins being polycondensed, whereby polyamide molecules are prevented from oxidative degradation.

The amount of phosphorus thus inevitably existing in the polyamide resins of the present invention in their industrial preparation is preferably 1 to 500 ppm, more preferably 5 to 300 ppm, even more preferably 10 to 200 ppm expressed as the phosphorus atom concentration. If the phosphorus atom concentration is less than 1 ppm, the polyamide resins are liable to yellowing, and if it exceeds 500 ppm, it may be difficult to control polymerization due to excessive amidation reaction during the synthesis of the polyamide resins.

Specific examples of hypophosphite compounds as antioxidants include hypophosphorous acid; metal salts of hypophosphorous acid such as sodium hypophosphite, potassium hypophosphite and lithium hypophosphite; hypophosphite compounds such as ethyl hypophosphite, dimethylphosphinic acid, phenylmethylphosphinic acid, phenylphosphonous acid and ethyl phenylphosphonite; metal salts of phenylphosphonous acid such as sodium phenylphosphonite, potassium phenylphosphonite and lithium phenylphosphonite, etc.

Specific examples of phosphite compounds include phosphorous acid, pyrophosphorous acid; metal salts of phosphorous acid such as sodium hydrogenphosphite and sodium phosphite; phosphite compounds such as triethyl phosphite, triphenyl phosphite, ethylphosphonic acid, phenylphosphonic acid and diethyl phenylphosphonate; metal salts of phenylphosphonic acid such as sodium ethylphosphonate, potassium ethylphosphonate, sodium phenylphosphonate, potassium phenylphosphonate and lithium phenylphosphonate, etc.

Among them, preferred antioxidants are metal salts of hypophosphorous acid such as sodium hypophosphite, potassium hypophosphite and lithium hypophosphite, especially sodium hypophosphite in view of the effect of promoting polymerization reaction of the polyamide resins and the effect of preventing discoloration.

The polyamide resins of the present invention preferably have a number average molecular weight (Mn) of 20,000 or less, typically 6,000 to 20,000.

If the number average molecular weight (Mn) is outside the range of 6,000 to 20,000, reactivity with elastomers tends to deteriorate. The number average molecular weight (Mn) is more preferably 8,000 to 17,000, even more preferably 9,000 to 15,000, especially 10,000 to 14,000, specifically 11,000 to 13,000. When it is in such ranges, reactivity, dispersibility and moldability improve.

The number average molecular weight (Mn) here is calculated from the terminal amino group concentration [$NH_2$] (µeq/g) and the terminal carboxyl group concentration [COOH] (µeq/g) of a polyamide resin by the equation below:

$$\text{Number average molecular weight}=2{,}000{,}000/([COOH]+[NH_2]).$$

The polyamide resins of the present invention preferably have a molecular weight distribution (Mw/Mn, weight average molecular weight/number average molecular weight) of 1.8 to 3.1. The molecular weight distribution is more preferably 1.9 to 3.0, even more preferably 2.0 to 2.9. Molecular weight distributions in such ranges help to provide moldings having excellent mechanical properties.

The molecular weight distribution of the polyamide resins can be controlled by, for example, appropriately selecting the types and amounts of initiators and catalysts used during polymerization and polymerization reaction conditions such as reaction temperature, pressure, period and the like. Alternatively, it can also be controlled by mixing multiple classes of XD10 polyamide resins having different average molecular weights obtained under different polymerization conditions or fractionally precipitating a polymerized polyamide resin.

The molecular weight distribution Mw/Mn can be determined by GPC analysis, specifically as a relative value equivalent to the molecular weight of poly (methyl methacrylate) used as a standard by employing the instrument "HLC-8320GPC" available from Tosoh Corporation and two "TSK gel Super HM-H" columns available from Tosoh Corporation eluting with 10 mmol/l sodium trifluoroacetate in hexafluoroisopropanol (HFIP) under conditions of a resin concentration of 0.02% by mass, a column temperature of 40° C., a flow rate of 0.3 ml/min and detection with a refractive index detector (RI). A calibration curve is generated from measurements of six PMMA standards dissolved in HFIP.

Moreover, the polyamide resins of the present invention preferably have a melt viscosity of 50 to 1200 Pa·s as determined under conditions of a test temperature controlled at the melting point of each polyamide resin plus 30° C., a shear rate of 122 $\text{sec}^{-1}$, and a moisture content of the polyamide resin of 0.06% by mass or less. By controlling the melt viscosity in such a range, moldability improves.

The melt viscosity is more preferably in the range of 60 to 700 Pa·s, even more preferably 70 to 500 Pa·s.

The melt viscosity of the polyamide resins can be controlled by, for example, appropriately selecting the loading ratio of starting dicarboxylic acid component and diamine component, polymerization catalyst, molecular weight modifier, polymerization temperature and polymerization period.

The polyamide resins of the present invention preferably have a melting point of 150 to 310° C., more preferably 180 to 300° C. The polyamide resins of the present invention also preferably have two or more melting points. Polyamide resins having two or more melting points are preferred because heat resistance and moldability tend to improve.

Moreover, the glass transition point of the polyamide resins is preferably 50 to 100° C., more preferably 55 to 100° C., especially preferably 60 to 100° C. When it is in the above ranges, heat resistance tends to improve.

The melting point refers to the temperature at the top of the endothermic peak during heating observed by differential scanning calorimetry (DSC). For polyamide resins having two or more melting points, measurements are made by taking the temperature at the top of an endothermic peak on the higher temperature side as the melting point.

The glass transition point refers to the glass transition point determined by melting a sample by heating it once to eliminate the influence of thermal history on crystallinity and then heating it again. The melting point can be determined from the temperature at the top of the endothermic peak observed by using, for example, DSC-60 available from SHIMADZU CORPORATION when a sample of about 5 mg is melted by heating from room temperature to a temperature equal to or higher than an expected melting point at a rate of 10° C./min under a nitrogen stream of 30 ml/min. Then, the melted polyamide resin is rapidly cooled with dry ice and heated again to a temperature equal to or higher than the melting point at a rate of 10° C./min, whereby the glass transition point can be determined.

The polyamide resins of the present invention can be combined with polyamide resins other than xylylenediamine-based polyamide resins. The other polyamide resins include polyamide 66, polyamide 6, polyamide 46, polyamide 6/66, polyamide 10, polyamide 612, polyamide 11, polyamide 12, polyamide 66/6T composed of hexamethylenediamine, adipic acid and terephthalic acid, and polyamide 6I/6T composed of hexamethylenediamine, isophthalic acid and terephthalic acid, etc.

Moreover, one or more of resins such as polyester resins, polyolefin resins, polyphenylene sulfide resins, polycarbonate resins, polyphenylene ether resins, modified polyphenylene ether resins, polystyrene resins and the like can also be blended so far as the object and benefits of the present invention are not affected.

The polyamide resins of the present invention are also preferably combined with polyphenylene ether resins or modified polyphenylene ether resins, and the polyphenylene ether resins may be any of homopolymers, copolymers or graft polymers. Examples of polyphenylene ether resins specifically include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and the like, among which poly(2,6-dimethyl-1,4-phenylene)ether, 2,6-dimethylphenol/2,3,6-trimethylphenol copolymers, and styrene-grafted copolymers thereof are especially preferred. Modified polyphenylene ether resins are obtained by reacting a polyphenylene ether resin with an unsaturated aliphatic carboxylic acid or an anhydride thereof.

When an anhydride of an unsaturated aliphatic carboxylic acid is used, a modified polyphenylene ether resin can be obtained by reacting the anhydride and a polyphenylene ether resin in the melt-mixed state in the absence of a catalyst. In this case, melt-mixing can be performed by using a kneader, Banbury mixer, extruder or the like. Examples of unsaturated aliphatic carboxylic anhydrides include maleic anhydride, itaconic anhydride, citraconic anhydride and the like, among which maleic anhydride is especially preferred.

The proportion of the carboxylic acid or an anhydride thereof used for modifying a polyphenylene ether resin is preferably 0.01 to 10 parts by mass, more preferably 0.1 to 3 parts by mass, especially preferably 0.1 to 1 part by mass per 100 parts by mass of the polyphenylene ether resin. If the proportion of the anhydride is less than 0.01 part by mass per 100 parts by mass of the polyphenylene ether resin, the compatibility between the polyphenylene ether resin and a polyamide resin is less improved so that a robust composition is less likely to be obtained, but if it exceeds 10 parts by mass, disadvantages such as thermal decomposition of the excessive anhydride occur, which leads to practical disadvantages such as decreased heat resistance or poor appearance. When an unsaturated aliphatic carboxylic acid is used for modifying a polyphenylene ether resin, a radical initiator such as benzoyl peroxide, dicumyl peroxide, cumene hydroperoxide or the like can be used as appropriate as a catalyst.

The proportion of a modified polyphenylene ether to a polyamide resin can be selected in a wide range, but preferably consists of 1 to 50 parts by mass, especially preferably 3 to 40 parts by mass of a modified polyphenylene ether resin per 100 parts by mass of a polyamide resin. If the proportion of a modified polyphenylene ether is lower than the above ranges, heat resistance and water absorption are less improved, but if it is higher than the above ranges, the flowability of the molten resin undesirably decreases during molding processes.

Modified polyphenylene ether resins that can be used also include reaction products obtained by reacting a composition composed of a polyphenylene ether resin and an elastomer with an unsaturated aliphatic carboxylic acid or an anhydride thereof.

3. Elastomers

The reactive polyamide resins of the present invention are highly reactive with elastomers so that their impact resistance and flexibility can be very effectively improved by elastomers. Thus, the reactive polyamide resins of the present invention can preferably be used as polyamide resin compositions containing elastomers.

Elastomers improve impact strength and any classes of rubber polymers (including thermoplastic elastomers) can be used without limitation, including, for example, known elastomers such as polyolefin elastomers, diene elastomers, polystyrene elastomers, polyamide elastomers, polyester elastomers, polyurethane elastomers, silicon elastomers and the like.

Polyolefin elastomers include, for example, polyisobutylene, ethylene-propylene copolymers (EPR), ethylene-propylene-butadiene copolymers (EPDM), ethylene-propylene-unconjugated diene copolymers, ethylene-butene-1 copolymers, ethylene-propylene-butene-1 copolymers, ethylene-hexene-1 copolymers, ethylene-vinyl acetate copolymers, ethylene-acrylic acid copolymers, ethylene-methacrylic acid copolymers, ethylene-glycidylacrylate copolymers, ethylene-glycidyl methacrylate copolymers, ethylene-vinyl acetate-glycidyl methacrylate copolymers, ethylene-maleic acid copolymers, ethylene-maleic anhydride copolymers and the like.

Diene elastomers include, for example, polybutadiene and hydrogenated products thereof, polyisoprene and hydrogenated products thereof, butadiene-styrene random copolymers and hydrogenated products thereof and the like.

Polystyrene elastomers include block copolymers of vinyl aromatic compounds, conjugated diene compounds and olefin compounds or hydrogenated products of these block copolymers (hereinafter simply referred to as hydrogenated block copolymers), specifically block copolymers composed of a polymer block based on at least one vinyl aromatic compound and a polymer block based on at least one conjugated diene compound as well as hydrogenated block copolymers obtained by hydrogenating 80% or more of aliphatic double bonds derived from the conjugated diene compound in the block copolymers.

The vinyl aromatic compound forming part of the polystyrene elastomers can be selected from one or more of styrene, α-methylstyrene, vinyl toluene, p-tert-butylstyrene, 1,1-diphenylethylene and the like, among which styrene is preferred. The conjugated diene compounds can be selected from one or more of, for example, butadiene, isoprene, 1,3-pentadiene, 2,3-dimethyl-1,3-butadiene and the like, among which butadiene, isoprene and a combination thereof are preferred. These may be copolymerized with olefin compounds, among which hydrogenated block copolymers combining styrene, ethylene and butadiene (SEBS) are preferred.

Among these, preferred elastomers include polyolefin elastomers, diene elastomers, polystyrene elastomers and the like, as well as those elastomers containing functional groups such as carboxyl group, anhydride groups, epoxy group and the like as described below.

When elastomers used in combination with the reactive polyamide resins of the present invention contain no functional group, it is also preferable to introduce a functional group (e.g., via chemical modification or modification by copolymerization or the like) to confer more compatibility. When elastomers having compatibility with polyamide resins in themselves are used, they may be used directly without such manipulation.

A functional group may be introduced by, for example, reacting 0.01 to 10 parts by mass of one or more compounds selected from α,β-unsaturated carboxylic acids, acrylamide, epoxy compounds or derivatives thereof with 100 parts by mass an elastomer containing no functional group (e.g., a polyolefin elastomer) in the presence or absence of a radical initiator.

Specific examples of α,β-unsaturated carboxylic acids and derivatives thereof include maleic acid, maleic anhydride, fumaric acid, itaconic acid, acrylic acid, glycidyl acrylate, 2-hydroxyethyl acrylate, methacrylic acid, glycidyl-methacrylate, 2-hydroxyethyl methacrylate, crotonic acid, cis-4-cyclohexene-1,2-dicarboxylic acid and anhydride thereof, endo,cis-bicyclo{2.2.1}-5-heptene-2,3-dicarboxylic acid and anhydride thereof, maleimide compounds, etc.

Radical initiators optionally used for introducing a functional group are not specifically limited and include, for example, organic peroxide initiators such as dicumyl peroxide, di-tert-butyl peroxide, tert-butylcumyl peroxide, 2,5-dimethyl-2,5-di(tert-butylperoxy)hexane, 2,5-dimethyl-2,5-di(tert-butylperoxy)hexane-3, n-butyl-4,4-bis(tert-butylperoxy)valerate, 1,1-bis(tert-butylperoxy)-3,3,5-trimethycyclohexane, tert-butylperoxytriphenylsilane and tert-butylperoxytrimethylsilane; as well as 2,3-dimethyl-2,3-diphenylbutane, 2,3-diethyl-2,3-diphenylbutane, 2,3-dimethyl-2,3-bis(p-methylphenyl)butane, 2,3-dimethyl-2,3-bis(bromophenyl)butane and the like.

The amount of the radical initiators used is typically 0.01 to 10 parts by mass, preferably 0.05 to 5 parts by mass per 100 parts by mass of an elastomer into which a functional group is to be introduced. The reaction for introducing a functional group can be performed by a known method such as, for example, melt kneading, solution mixing or the like.

The amount of the elastomers added is preferably selected in a range of 0.5 to 100 parts by mass per 100 parts by mass of a reactive polyamide resin. If the amount of the elastomers is less than 0.5 parts by mass, the effect of adding the elastomers on improvements in strength and the like is insufficient, but if it exceeds 100 parts by mass, molded articles obtained from the polyamide resin compositions are poor in mechanical properties such as strength. The amount of the elastomers is more preferably 1 to 50 parts by mass, more preferably 3 to 30 parts by mass per 100 parts by mass of a reactive polyamide resin.

In molded articles prepared from polyamide resin compositions containing a reactive polyamide resin and an elastomer, the reactive polyamide resin and the elastomer may have partially reacted. The reaction here refers to ionic bonding, hydrogen bonding, dehydration reaction, condensation reaction or the like, which is preferred because dispersibility is improved by the reaction between the reactive polyamide resin and the elastomer.

4. Additives and the Like

The polyamide resin compositions of the present invention may contain additives including stabilizers such as antioxidants and heat stabilizers, hydrolysis resistance improvers, weather stabilizers, fillers, matting agents, UV absorbers, nucleating agents, plasticizers, dispersing agents, flame retardants, antistatic agents, discoloration inhibitors, anti-gelling agents, colorants, release agents and the like so far as the benefits of the present invention are not affected.

[4.1 Stabilizers]

The polyamide resin compositions of the present invention preferably contain stabilizers (antioxidants, heat stabilizers). Stabilizers preferably include, for example, organic stabilizers such as phosphorus stabilizers, hindered phenol stabilizers, hindered amine stabilizers, oxanilide stabilizers, organic sulfur stabilizers and secondary aromatic amine stabilizers; and inorganic stabilizers such as copper compounds and halides. Phosphorus stabilizers preferably include phosphite compounds and phosphonite compounds.

Phosphite compounds include, for example, distearylpentaerythritol diphosphite, dinonylphenylpentaerythritol diphosphite, bis(2,4-di-t-butylphenyl)pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-sec-butylphenyl)pentaerythritol diphosphite, bis(2,6-di-t-butyl-4-t-octylphenyl)pentaerythritol diphosphite, bis(2,4-dicumylphenyl)pentaerythritol diphosphite and the like, among which bis(2,6-di-t-butyl-4-methylphenyl)pentaerythritol diphosphite and bis(2,4-dicumylphenyl)pentaerythritol diphosphite are preferred.

Phosphonite compounds include, for example, tetrakis(2,4-di-t-butylphenyl)-4,4'-biphenylene diphosphonite, tetrakis(2,5-di-t-butylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,6-di-t-butyl-5-ethylphenyl)-4,4'-biphenylene diphosphonite, tetrakis(2,3,4-tributylphenyl)-4,4'-biphenylene diphosphonite, tetrakis(2,4,6-tri-t-butylphenyl)-4,4'-biphenylene diphosphonite and the like, among which tetrakis(2,4-di-t-butylphenyl)-4,4'-biphenylene diphosphonite is preferred.

Hindered phenol stabilizers include, for example, n-octadecyl-3-(3,5-di-t-butyl-4-hydroxyphenyl)propionate, 1,6-hexanediol bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{3-(3-t-butyl-4-hydroxy-5-methylphenyl)propionyloxy}ethyl]-2,4,8,10-tetraoxaspiro[5,5]undecane, triethylene glycol bis[3-(3-t-butyl-5-methyl-4-hydroxyphenyl)propionate], 3,5-di-t-butyl-4-hydroxybenzyl phosphonate diethyl ester, 1,3,5-trimethyl-2,4,6-tris(3,5-di-t-butyl-4-hydroxybenzyl)

benzene, 2,2-thiodiethylenebis[3-(3,5-di-t-butyl-4-hydroxyphenyl)propionate], tris(3,5-di-t-butyl-4-hydroxybenzyl)isocyanurate, N,N'-hexamethylenebis(3,5-di-t-butyl-4-hydroxyhydrocinnamide) and the like. Among them, n-octadecyl-3-(3,5-di-t-butyl-4-hydroxyphenyl)propionate, 1,6-hexanediol bis[3-(3,5-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy}ethyl]-2,4,8,10-tetraoxaspiro[5,5]undecane and N,N'-hexamethylenebis(3,5-di-t-butyl-4-hydroxyhydrocinnamide) are preferred.

Hindered amine stabilizers include, for example, well-known hindered amine compounds having a 2,2,6,6-tetramethylpiperidine skeleton. Specific examples of hindered amine compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl)hexamethylene-1,6-dicarbamate, tris(2,2,6,6-tetramethyl-4-piperidyl)benzene-1,3,5-tricarboxylate, tris(2,2,6,6-tetramethyl-4-piperidyl)benzene-1,3,4-tricarboxylate, 1-[2-{(3-(3,5-di-t-butyl-4-hydroxyphenyl)propionyloxy}butyl]-4-[3-(3,5-di-t-butyl-4-hydroxyphenyl)propionyloxy]-2,2,6,6-tetramethylpiperidine, the condensation product of 1,2,3,4-butanetetracarboxylic acid and 1,2,2,6,6-pentamethyl-4-piperidinol and β,β,β',β'-tetramethyl-3,9-[2,4,8,10-tetraoxaspiro(5,5)undecane]diethanol, the polycondensation product of dimethyl succinate and 1-(2-hydroxyethyl)-4-hydroxy-2,2,6,6-tetramethylpiperidine, 1,3-benzenedicarboxamide-N,N'-bis(2,2,6,6-tetramethyl-4-piperidyl) and the like.

Commercially available hindered amine stabilizers include the products available from ADEKA CORPORATION under the brand names "ADK STAB LA-52, LA-57, LA-62, LA-67, LA-63P, LA-68LD, LA-77, LA-82, LA-87"; the products available from Ciba Specialty Chemicals Inc. under the brand names "TINUVIN 622, 944, 119, 770, 144"; the product available from Sumitomo Chemical Company under the brand name "SUMISORB 577"; the products available from American Cyanamid Company under the brand names "CYASORB UV-3346, 3529, 3853"; and the product available from Clariant (Japan) K.K. under the brand name "Nylostab S-EED", etc.

Amine antioxidants refer to amine compounds other than the hindered amine stabilizers mentioned above, and include, for example, the reaction products of N-phenylbenzeneamine with 2,4,4-trimethylpentene available from Ciba Specialty Chemicals Inc. under various brand names (IRGANOX 5057); and the products available from Ouchi Shinko Chemical Industrial Co., Ltd. under various brand names such as octylated diphenylamine (NOCRAC AD-F), N,N'-diphenyl-p-phenylenediamine (NOCRAC DP), N-phenyl-N'-isopropyl-p-phenylenediamine (NOCRAC 810-NA), N-phenyl-N'-(1,3-dimethylbutyl)-p-phenylenediamine (NOCRAC 6C), N,N'-di-2-naphthyl-p-phenylenediamine (NOCRAC White), polymerized 2,2,4-trimethyl-1,2-dihydroquinoline (NOCRAC 224), and 6-ethoxy-1,2-dihydro-2,2,4-trimethylquinoline (NOCRAC AW) and the like.

Oxanilide stabilizers preferably include 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxanilide, 2-ethoxy-5-tert-butyl-2'-ethoxanilide and mixtures thereof with 2-ethoxy-2'-ethyl-5,4'-di-tert-butoxanilide, mixtures of o- and p-methoxydisubstituted oxanilides, mixtures of o- and p-ethoxydisubstituted oxanilides and the like.

Organic sulfur stabilizers include, for example, organic thioate compounds such as didodecyl thiodipropionate, ditetradecyl thiodipropionate, dioctadecyl thiodipropionate, pentaerythritol tetrakis(3-dodecylthiopropionate) and thiobis(N-phenyl-β-naphthylamine); mercaptobenzimidazole compounds such as 2-mercaptobenzothiazole, 2-mercaptobenzimidazole, 2-mercaptomethylbenzimidazole and metal salts of 2-mercaptobenzimidazole; dithiocarbamate compounds such as metal salts of diethyldithiocarbamic acid and metal salts of dibutyldithiocarbamic acid; and thiourea compounds such as 1,3-bis(dimethylaminopropyl)-2-thiourea and tributylthiourea; as well as tetramethylthiuram monosulfide, tetramethylthiuram disulfide, nickel dibutyl dithiocarbamate, nickel isopropyl xanthate, trilauryl trithiophosphite and the like.

Among them, mercaptobenzimidazole compounds, dithiocarbamate compounds, thiourea compounds and organic thioate compounds are preferred, among which mercaptobenzimidazole compounds and organic thioate compounds are more preferred. Especially, thioether compounds having a thioether structure can be conveniently used because they accept oxygen from oxidized materials to reduce it. Specifically, 2-mercaptobenzimidazole, 2-mercaptomethylbenzimidazole, ditetradecyl thiodipropionate, dioctadecyl thiodipropionate and pentaerythritol tetrakis(3-dodecylthiopropionate) are more preferred, among which ditetradecyl thiodipropionate, pentaerythritol tetrakis(3-dodecylthiopropionate) and 2-mercaptomethylbenzimidazole are still more preferred, and pentaerythritol tetrakis(3-dodecylthiopropionate) is especially preferred.

The organic sulfur compounds typically have a molecular weight of 200 or more, preferably 500 or more and typically up to 3,000.

Secondary aromatic amine stabilizers preferably include compounds having a diphenylamine skeleton, compounds having a phenylnaphthylamine skeleton and compounds having a dinaphthylamine skeleton, more preferably compounds having a diphenylamine skeleton and compounds having a phenylnaphthylamine skeleton. Specifically, compounds having a diphenylamine skeleton include p,p'-dialkyldiphenylamine (wherein the alkyl group contains 8 to 14 carbon atoms), octylated diphenylamine, 4,4'-bis(α,α-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenediamine; compounds having a phenylnaphthylamine skeleton include N-phenyl-1-naphthylamine and N,N'-di-2-naphtyl-p-phenylenediamine; and compounds having a dinaphthylamine skeleton include 2,2'-dinaphthylamine, 1,2'-dinaphthylamine and 1,1'-dinaphthylamine. Among them, 4,4'-bis(α,α-dimethylbenzyl)diphenylamine, N,N'-di-2-naphtyl-p-phenylenediamine and N,N'-diphenyl-p-phenylenediamine are more preferred, among which N,N'-di-2-naphtyl-p-phenylenediamine and 4,4'-bis(α,α-dimethylbenzyl)diphenylamine are especially preferred.

When the organic sulfur stabilizers or secondary aromatic amine stabilizers mentioned above are contained, they are preferably used in combination. By combining them, heat aging resistance tends to be better than the case in which either one is used.

Preferred combinations of more specific organic sulfur stabilizers and secondary aromatic amine stabilizers include combinations of at least one organic sulfur stabilizer selected from ditetradecyl thiodipropionate, 2-mercaptomethylbenzimidazole and pentaerythritol tetrakis(3-dodecylthiopropionate) and at least one secondary aromatic amine stabilizer selected from 4,4'-bis(α,α-dimethylbenzyl)diphenylamine and N,N'-di-2-naphtyl-p-phenylenediamine. A combination of an organic sulfur stabilizer consisting of pentaerythritol tetrakis(3-dodecylthiopropionate) and a secondary aromatic amine stabilizer consisting of N,N'-di-2-naphtyl-p-phenylenediamine is more preferred.

When the organic sulfur stabilizers and secondary aromatic amine stabilizers mentioned above are used in combination, the ratio (mass ratio) of the amounts of the secondary aromatic amine stabilizers/organic sulfur stabilizers contained in a polyamide resin composition is preferably 0.05 to 15, more preferably 0.1 to 5, even more preferably 0.2 to 2. By selecting such a content ratio, heat aging resistance can be efficiently improved while retaining barrier properties.

Inorganic stabilizers preferably include copper compounds and halides.

Copper compounds are copper salts of various inorganic or organic acids excluding the halides described below. Copper may be either cuprous or cupric, and specific examples of copper salts include copper chloride, copper bromide, copper iodide, copper phosphate, copper stearate as well as natural minerals such as hydrotalcite, stichitite and pyrolite.

Halides used as inorganic stabilizers include, for example, alkali metal or alkaline earth metal halides; ammonium halides and quaternary ammonium halides of organic compounds; and organic halides such as alkyl halides and allyl halides, specific examples of which include ammonium iodide, stearyl triethyl ammonium bromide, benzyl triethyl ammonium iodide and the like. Among them, alkali metal halide salts such as potassium chloride, sodium chloride, potassium bromide, potassium iodide and sodium iodide are preferred.

Combinations of copper compounds and halides, especially combination of copper compounds and alkali metal halide salts are preferred because they provide excellent effects in resistance to heat-induced discoloration and weatherability (light resistance). For example, when a copper compound is used alone, the molding may be discolored in reddish brown by copper, which is not preferred for use in some applications. However, the discoloration in reddish brown can be prevented by combining the copper compound with a halide.

In the present invention, amine antioxidants, inorganic stabilizers, organic sulfur stabilizers and secondary aromatic amine stabilizers are especially preferred among the stabilizers described above in terms of processing stability during heating under pressure, heat aging resistance, film appearance and discoloration prevention.

Preferably, the content of the stabilizers is typically 0.01 to 1 part by mass, more preferably 0.01 to 0.8 parts by mass per 100 parts by mass of a polyamide resin. Heat-induced discoloration and weatherability/light resistance can be sufficiently improved by controlling the content at 0.01 part by mass or more, while deterioration of mechanical properties can be reduced by controlling the content at 1 part by mass or less.

[4.2 Hydrolysis Resistance Improvers—Carbodiimide Compounds]

The polyamide resin compositions of the present invention preferably contain a carbodiimide compound as a hydrolysis resistance improver. Carbodiimide compounds preferably include aromatic, aliphatic or alicyclic polycarbodiimide compounds prepared by various processes. Among them, aliphatic or alicyclic polycarbodiimide compounds are preferred in terms of melt kneadability during extrusion or the like, and alicyclic polycarbodiimide compounds are more preferably used.

These carbodiimide compounds can be prepared by decarboxylative condensation of organic polyisocyanates. For example, they can be synthesized by decarboxylative condensation of various organic polyisocyanates at a temperature of about 70° C. or more in an inert solvent or without using a solvent in the presence of a carbodiimidation catalyst. The isocyanate content is preferably 0.1 to 5% by mass, more preferably 1 to 3% by mass. The content in the above ranges tends to facilitate the reaction with polyamide resins and to improve hydrolysis resistance.

Organic polyisocyanates that can be used as starting materials for synthesizing the carbodiimide compounds include, for example, various organic diisocyanates such as aromatic diisocyanates, aliphatic diisocyanates and alicyclic diisocyanates and mixtures thereof.

Examples of organic diisocyanates specifically include 1,5-naphthalenediisocyanate, 4,4'-diphenylmethanediisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis(4,1-cyclohexylene)diisocyanate and the like, and two or more of them can be used in combination. Among them, dicyclohexylmethane-4,4-diisocyanate and methylenebis(4,1-cyclohexylene)diisocyanate are preferred.

To cap the ends of the carbodiimide compounds to control their degree of polymerization, end capping agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The end-capping agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compounds is preferably 0.1 to 2 parts by mass, more preferably 0.2 to 1.5 parts by mass, even more preferably 0.3 to 1.5 parts by mass per 100 parts by mass of a polyamide resin. If it is less than 0.1 part by mass, hydrolysis resistance is insufficient so that uneven delivery is more likely to occur during melt kneading such as extrusion, leading to insufficient melt kneading. If it exceeds 2 parts by mass, however, the viscosity during melt kneading significantly increases, which may result in low melt kneadability and moldability.

[4.3 Fillers and the Like]

The polyamide resin compositions of the present invention also preferably contain fillers in addition to elastomers. The fillers are not specifically limited so far as they are conventionally used, and inorganic fillers in the form of powder, fiber, grain endplate as well as resin fillers or natural fillers can preferably be used.

Fillers in the form of powder and grain that can be used preferably have a particle size of 100 μm or less, more preferably 80 μm or less, and include kaolinite, silica; carbonates such as calcium carbonate and magnesium carbonate; sulfates such as calcium sulfate and magnesium sulfate; alumina, glass beads, carbon black, sulfites and metal oxides, etc. Fillers in the form of fiber that can be used include glass fibers, whiskers of potassium titanate or calcium sulfate, wollastonite, carbon fibers, mineral fibers, and alumina fibers and the like. Fillers in the form of plate include glass flakes, mica, talc, clay, graphite, sericite and the like. Among them, at least one selected from glass fibers, talc, mica and wollastonite are preferred, among which glass fibers are especially preferred.

Resin fillers include aromatic crystalline polyester resins, all aromatic polyamide resins, acrylic fibers, poly(benzimidazole) fibers and the like.

Natural fillers include kenaf, pulp, hemp pulp, wood pulp and the like.

The content of the fillers is preferably 15 to 200 parts by mass, more preferably 30 to 180 parts by mass, even more preferably 50 to 150 parts by mass per 100 parts by mass of a polyamide resin. If the content is less than 15 parts by mass, the resulting moldings tend to be insufficient in mechanical strength, but if it exceeds 200 parts by mass, the flowability of the polyamide resins deteriorate to cause difficulty in melt kneading, molding and the like.

[4.4 Release Agents]

The polyamide resin compositions of the present invention may contain release agents.

Release agents include, for example, aliphatic carboxylic acids, esters of aliphatic carboxylic acids and alcohols, aliphatic hydrocarbon compounds having a number average molecular weight of 200 to 15,000, polysiloxane silicone oil and the like.

Aliphatic carboxylic acids include, for example, saturated or unsaturated aliphatic mono-, di- or tricarboxylic acids. The aliphatic carboxylic acids here also include alicyclic carboxylic acids. Among them, aliphatic carboxylic acids are preferably mono- or dicarboxylic acids containing 6 to 36 carbon atoms, more preferably aliphatic saturated monocarboxylic acids containing 6 to 36 carbon atoms. Specific example of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid, azelaic acid, etc.

Aliphatic carboxylic acids that can be used in esters of aliphatic carboxylic acids and alcohols include, for example, the aliphatic carboxylic acids listed above. Alcohols include, for example, saturated or unsaturated mono- or polyalcohols. These alcohols may have substituents such as fluorine atom and aryl group. Among them, saturated mono- or polyalcohols containing 30 or less carbon atoms are preferred, specifically aliphatic or alicyclic saturated monoalcohols or aliphatic saturated polyalcohols containing 30 or less carbon atoms are more preferred.

Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol and the like.

Specific examples of esters of aliphatic carboxylic acids and alcohols include beeswax (mixtures containing myricyl palmitate as a major component), stearyl stearate, behenyl behenate, stearyl behenate, glyceryl monopalmitate, glyceryl monostearate, glyceryl distearate, glyceryl tristearate, pentaerythritol monopalmitate, pentaerythritol monostearate, pentaerythritol distearate, pentaerythritol tristearate, pentaerythritol tetrastearate and the like.

Aliphatic hydrocarbons having a number average molecular weight of 200 to 15,000 include, for example, liquid paraffin, paraffin waxes, microwaxes, polyethylene waxes, Fischer-Tropsch waxes, α-olefin oligomers containing 3 to 12 carbon atoms and the like. The aliphatic hydrocarbons here also include alicyclic hydrocarbons. The aliphatic hydrocarbons preferably have a number average molecular weight of 5,000 or less.

Among them, paraffin waxes, polyethylene waxes or partial oxides of polyethylene waxes are preferred, among which paraffin waxes and polyethylene waxes are more preferred.

The content of the release agents is preferably 0.001 to 2 parts by mass, more preferably 0.01 to 1 part by mass per 100 parts by mass of a polyamide resin.

In the polyamide resin compositions of the present invention, crystal nucleating agents can be used depending on the desired moldability. The crystal nucleating agents include not only those conventionally used such as talc and boron nitride but also organic nucleating agents. In the case of organic nucleating agents or boron nitride, the content of the nucleating agents is 0.001 to 6 parts by mass, preferably 0.02 to 2 parts by mass, more preferably 0.05 to 1 part by mass per 100 parts by mass of a polyamide resin. If it is too low, an expected effect cannot be obtained from the nucleating agents so that releasability may decrease, but if it is too high, impact resistance and surface appearance tend to deteriorate. When talc is used, the content is 0.1 to 8 parts by mass, preferably 0.3 to 2 parts by mass. In the case of inorganic nucleating agents other than talc and boron nitride, the content is 0.3 to 8 parts by mass, preferably 0.5 to 4 parts by mass. If it is too low, the nucleating agents are not effective, but if it is too high, they act as impurities so that mechanical strength or impact resistance tends to decrease. In view of mechanical properties such as impact resistance, tensile elongation and bending deflection, talc or boron nitride should preferably be contained.

Talc preferably has a number average particle size of 2 μm or less. Boron nitride typically has a number average particle size of 10 μm or less, preferably 0.005 to 5 μm, more preferably 0.01 to 3 μm. The number average particle size of talc is typically the value obtained by a measurement using a particle size distribution analyzer based on laser diffraction/scattering.

5. Molded Articles

Molded articles obtained by using the polyamide resin compositions of the present invention include various moldings such as films, sheets, laminated films, laminated sheets, tubes, hoses, pipes, profile extrusions, hollow containers, bottles, fibers, parts of various shapes and the like.

Molded articles obtained by using polyamide resin compositions comprising a polyamide resin of the present invention and an elastomer and optionally other ingredients are excellent in impact resistance and flexibility as well as heat resistance, strength and various mechanical properties so that they can be conveniently used as injection moldings, films, sheets, tubes, hoses, threads, fibers and the liked in various applications including films, sheets, laminated films, laminated sheets, tubes, hoses, pipes, various containers such as hollow containers and bottles, domestic goods, industrial resources, industrial materials, electric/electronic equipment parts, parts of vehicles such as automobiles, general machine parts, precision machine parts and the like.

EXAMPLES

The following examples and comparative examples further illustrate the present invention in detail, but the present invention should not be construed as being limited to these examples.

[Methods for Analyzing Various Physical Properties of Polyamide Resins]

The methods for evaluating polyamide resins used in the examples and comparative examples are as follows.

(Melting Point and Glass Transition Point of Polyamide Resins)

Melting point was determined from the temperature at the top of the endothermic peak by differential scanning calorimetry (DSC) using DSC-60 available from SHIMADZU CORPORATION when a polyamide resin sample was melted by heating from 30° C. to a temperature equal to or higher than an expected melting point at a rate of 10° C./min. The melted sample was cooled with dry ice and then heated to a temperature equal to or higher than the melting point at a rate of 10° C./min to determine the glass transition point.

(Melt Viscosity)

Melt viscosity was measured using Capillograph D-1 available from Toyoseiki Seisaku-sho, Ltd. equipped with a die of 1 mmϕ×10 mm in length under conditions of an apparent shear rate of 122 sec$^{-1}$, a test temperature controlled at the melting point plus 30° C., and a moisture content of 0.06% by mass or less in each polyamide resin. For polyamide resins having two or more melting points, measurements were made by taking the temperature at the top of an endothermic peak on the higher temperature side as the melting point.

(Amino Group Concentration ([NH$_2$]))

In 30 ml of a phenol/ethanol (4:1) mixed solution was dissolved 0.2 g of each of the polyamide resins obtained by the procedures described below with stirring at 20 to 30° C., and this solution was titrated with 0.01N hydrochloric acid to determine the concentration.

(Carboxyl Group Concentration ([COOH]))

In 30 ml of benzyl alcohol was dissolved 0.1 g of each of the polyamide resins obtained by the procedures described below at 200° C., and 0.1 ml of a phenol red solution was added in the range of 160° C. to 165° C. This solution was titrated with a titration solution of 0.132 g of KOH in 200 ml of benzyl alcohol (0.01 mol/l expressed as KOH content) to determine the concentration.

(Number Average Molecular Weight)

Number average molecular weight was calculated by the equation below from the values of the terminal amino group concentration [NH$_2$] (μeq/g) and the terminal carboxyl group concentration [COOH] (μeq/g) of each polyamide resin determined by the neutralization titrations described above.

$$\text{Number average molecular weight} = 2 \times 1{,}000{,}000 / ([COOH] + [NH_2]).$$

(Reaction Molar Ratio)

Reaction molar ratio was determined by the equation below described above.

$$r = (1 - cN - b(C-N))/(1 - cC + a(C-N))$$

wherein:
a: $M_1/2$
b: $M_2/2$
c: 18.015
$M_1$: the molecular weight of the diamine (g/mol)
$M_2$: the molecular weight of the dicarboxylic acid (g/mol)
N: amino group concentration (eq/g)
C: carboxyl group concentration (eq/g).

(YI)

The pellets obtained in the examples below were held at 300° C. under a nitrogen stream for 3 hrs in an inert oven, and analyzed for YI before and after heating according to JIS K-7105 using the spectrophotometer model SE2000 available from NIPPON DENSHOKU INDUSTRIES CO., LTD. in reflectance mode. Further, the difference between them was reported (difference in YI in Table 1).

Example 1

Synthesis of Polyamide Resin-1 (PXD10)

A reaction vessel having an internal volume of 50 liters equipped with a stirrer, a partial condenser, a total condenser, a thermometer, a dropping device and a nitrogen inlet as well as a strand die was charged with precisely weighed 8950 g (44.25 mol) of sebacic acid, 12.54 g (0.074 mol) of calcium hypophosphite, and 6.45 g (0.079 mol) of sodium acetate. The inside of the reaction vessel was thoroughly purged with nitrogen and then pressurized with nitrogen to 0.3 MPa and heated to 160° C. with stirring to homogeneously melt sebacic acid. Then, 6039.2 g (44.34 mol) of p-xylylenediamine was added dropwise with stirring over 170 min. During then, the internal temperature was continuously raised to 281° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of p-xylylenediamine, the pressure was lowered at a rate of 0.4 MPa/hr to atmospheric pressure over 60 min. During then, the internal temperature rose to 299° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give about 13 kg of polyamide resin-1.

Example 2

Synthesis of Polyamide Resin-2 (MPXD10)

Polyamide resin-2 was obtained in the same manner as in Example 1 except that 6066.3 g (44.54 mol) of a diamine mixture of m-xylylenediamine and p-xylylenediamine in the ratio described in the table below was added dropwise.

Example 3

Synthesis of Polyamide Resin-3 (MPXD10)

A reaction vessel equipped with a stirrer, a partial condenser, a total condenser, a thermometer, a dropping funnel and a nitrogen inlet as well as a strand die was charged with precisely weighed 12,135 g (60 mol) of sebacic acid, 3.105 g of sodium hypophosphite monohydrate ($NaH_2PO_2.H_2O$) (50 ppm expressed as the phosphorus atom concentration in the polyamide resin) and 1.61 g of sodium acetate, and thoroughly purged with nitrogen and then heated to 170° C. while stirring the inside of the system under a small amount of a nitrogen gas stream.

To this was added dropwise 8,258.6 g (60.64 mol) of a 5:5 diamine mixture of m-xylylenediamine and p-xylylenediamine with stirring and the inside of the system was continuously heated while the condensed water generated was removed outside the system. After completion of the dropwise addition of the xylylenediamine mixture, melt polymerization reaction was continued for 20 min at an internal temperature of 260° C. Then, the inside of the system was pressurized with nitrogen, and the polymer was collected from the strand die and pelletized to give about 13 kg of polyamide resin-3.

Example 4

Synthesis of Polyamide Resin-4 (MPXD10)

Polyamide resin-4 was obtained in the same manner as in Example 3 except that 8,261.9 g (60.66 mol) of the diamine mixture was added dropwise.

Example 5

Synthesis of Polyamide Resin-5 (MPXD10)

A reaction vessel equipped with a stirrer, a partial condenser, a total condenser, a thermometer, a dropping funnel and a nitrogen inlet as well as a strand die was charged with precisely weighed 12,135 g (60 mol) of sebacic acid, 3.105 g of sodium hypophosphite monohydrate ($NaH_2PO_2.H_2O$) (50 ppm expressed as the phosphorus atom concentration in the polyamide resin) and 1.61 g of sodium acetate, and thoroughly purged with nitrogen and then heated to 170° C. while stirring the inside of the system under a small amount of a nitrogen gas stream. To this was added dropwise 8257.8 g (60.63 mol) of a diamine mixture of m-xylylenediamine and p-xylylenediamine in the ratio described in the table below with stirring over 100 min. During then, the internal temperature was continuously raised to 235° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of the diamine mixture, stirring was continued for 20 min, and then the pressure was lowered at a rate of 0.4 MPa/hr to atmospheric pressure over 30 min. During then, the internal temperature rose to 236° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 15 min. Then, the inside of the system was pressurized with nitrogen, and the polymer was collected from the strand die and pelletized to give polyamide resin-5.

Example 6

Synthesis of Polyamide Resin-6 (MPXD10)

Polyamide resin-6 was obtained in the same manner as in Example 5 except that 8237.4 g (60.48 mol) of the diamine mixture was added dropwise.

Example 7

Synthesis of Polyamide Resin-7 (MXD10)

A reaction vessel equipped with a stirrer, a partial condenser, a total condenser, a thermometer, a dropping funnel and a nitrogen inlet as well as a strand die was charged with 12,135 g (60 mol) of sebacic acid (SA1), 4.6574 g of sodium hypophosphite monohydrate ($NaH_2PO_2.H_2O$) (75 ppm expressed as the phosphorus atom concentration in the polyamide resin) and 2.4151 g of sodium acetate, and thoroughly purged with nitrogen and then heated to 170° C. while stirring the inside of the system under a small amount of a nitrogen gas stream. To this was added dropwise 8236.6 g (60.47 mol) of m-xylylenediamine (MXDA) with stirring and the inside of the system was continuously heated while the condensed water generated was removed outside the system. After completion of the dropwise addition of m-xylylenediamine, melt polymerization reaction was continued for 20 min at an internal temperature of 220° C.

Then, the inside of the system was pressurized with nitrogen, and the polymer was collected from the strand die and pelletized to give polyamide resin-7.

Evaluation results of the polyamide resins 1-7 indicated above are described in Table 1.

Comparative Example 1

Synthesis of Polyamide Resin-8 (MXD10)

A reaction vessel equipped with a stirrer, a partial condenser, a total condenser, a thermometer, a dropping funnel and a nitrogen inlet as well as a strand die was charged with 12,135 g (60 mol) of sebacic acid (SA1), and thoroughly purged with nitrogen and then heated to 170° C. while stirring the inside of the system under a small amount of a nitrogen gas stream.

To this was added dropwise 8163.8 g (59.94 mol) of m-xylylenediamine (MXDA) with stirring and the inside of the system was continuously heated while the condensed water generated was removed outside the system. After completion of the dropwise addition of m-xylylenediamine, melt polymerization reaction was continued for 40 min at an internal temperature of 260° C.

Then, the inside of the system was pressurized with nitrogen, and the polymer was collected from the strand die and pelletized to give polyamide resin-8. Evaluation results of this polyamide resin are described in Table 1.

Comparative Example 2

Synthesis of Polyamide Resin-9 (MXD10)

A reaction vessel equipped with a stirrer, a partial condenser, a total condenser, a thermometer, a dropping funnel and a nitrogen inlet as well as a strand die was charged with 12,135 g (60 mol) of sebacic acid (SA1), and thoroughly purged with nitrogen and then heated to 170° C. while stirring the inside of the system under a small amount of a nitrogen gas stream.

To this was added dropwise 8147.5 g (59.82 mol) of m-xylylenediamine (MXDA) with stirring and the inside of the system was continuously heated while the condensed water generated was removed outside the system. After completion of the dropwise addition of m-xylylenediamine, melt polymerization reaction was continued for 30 min at an internal temperature of 250° C.

Then, the inside of the system was pressurized with nitrogen, and the polymer was collected from the strand die and pelletized to give polyamide resin-9. Evaluation results of this polyamide resin are described in Table 1.

Comparative Example 3

Synthesis of Polyamide Resin-10 (MXD10)

A reaction vessel equipped with a stirrer, a partial condenser, a total condenser, a thermometer, a dropping funnel and a nitrogen inlet as well as a strand die was charged with 12,135 g (60 mol) of sebacic acid (SA1), and thoroughly purged with nitrogen and then heated to 170° C. while stirring the inside of the system under a small amount of a nitrogen gas stream.

To this was added dropwise 8065.8 g (59.22 mol) of m-xylylenediamine (MXDA) with stirring and the inside of the system was continuously heated while the condensed water generated was removed outside the system. After completion of the dropwise addition of m-xylylenediamine, melt polymerization reaction was continued for 15 min at an internal temperature of 220° C.

Then, the inside of the system was pressurized with nitrogen, and the polymer was collected from the strand die and pelletized to give polyamide resin-10. Evaluation results of this polyamide resin are described in Table 1.

Comparative Example 4

Synthesis of Polyamide Resin-11 (PXD10)

This polyamide resin was synthesized in the same manner as in Example 1 except that 5951.2 g of p-xylylenediamine was added dropwise.

TABLE 1

| | Resin | Diamine (molar ratio) | Melting point (° C.) | Glass transition point (° C.) | Melt viscosity (Pa·s) | Terminal amino group content (μeq/g) | Terminal carboxyl group content (μeq/g) | Reactive functional group content (μeq/g) | Number average molecular weight (Mn) | Reaction molar ratio | YI before heating | YI after heating | Difference in YI |
|---|---|---|---|---|---|---|---|---|---|---|---|---|---|
| Example 1 | Polyimide resin 1 | PXDA | 290 | 75 | 178 | 58 | 48 | 106 | 18868 | 1.0015 | −2 | 27 | 29 |
| Example 2 | Polyimide resin 2 | MXDA/PXDA (30/70) | 258 | 70 | 700 | 72 | 31 | 103 | 19417 | 1.0062 | −3 | 10 | 13 |
| Example 3 | Polyimide resin 3 | MXDA/PXDA (50/50) | 238 | 67 | 401 | 95 | 30 | 125 | 16000 | 1.0099 | −6 | 1 | 7 |
| Example 4 | Polyamdde resin 4 | MXDA/PXDA (50/50) | 238 | 67 | 272 | 110 | 42 | 152 | 13158 | 1.0103 | −5 | 0 | 5 |
| Example 5 | Polyimide resin 5 | MXDA/PXDA (70/30) | 215 | 63 | 203 | 115 | 50 | 165 | 12121 | 1.0099 | −9.4 | −3.5 | 5.9 |
| Example 6 | Polyimide resin 6 | NXDA/PXDA (70/30) | 215 | 63 | 149 | 111 | 60 | 171 | 11696 | 1.0077 | −6.9 | −4.1 | 2.8 |
| Example 7 | Polyimide resin 7 | MXDA | 190 | 60 | 50 | 120 | 73 | 193 | 10363 | 1.0071 | −7 | −1 | 6 |
| Comparative example 1 | Polyimide resin 8 | MXDA | 190 | 60 | 1010 | 40 | 50 | 90 | 22222 | 0.9985 | −3 | 40 | 43 |
| Comparative example 2 | Polyimide resin 9 | MXDA | 190 | 60 | 853 | 45 | 70 | 115 | 17391 | 0.9962 | −2 | — | — |
| Comparative example 3 | Polyimide resin 10 | MXDA | 190 | 60 | 31 | 90 | 210 | 300 | 6667 | 0.9819 | −4 | — | — |
| Comparative example 4 | Polyimide resin 11 | PXDA | 290 | 75 | 160 | 26 | 113 | 139 | 14388 | 0.9869 | 1.3 | 64 | 62.7 |

Examples 8, 9 and Comparative example 5

Preparation of Polyamide Resin/Elastomer Compositions

<Ingredients Used>

The elastomers used are (EL1) to (EL2) below.

EL1: A maleic acid-modified ethylene-propylene copolymer available from Mitsui Chemicals, Inc. under the brand name "TAFMER MP0610".

EL2: A maleic acid-modified hydrogenated styrene-butadiene/butylene-styrene block copolymer available from Asahi Kasei Corporation under the brand name "TUFTEC MP1913".

The glass fiber used as a filler and the release agent used are shown below.
Glass fiber: Chopped strands available from Nippon Electric Glass Co., Inc. under the brand name "T-275H".
Release agent: Calcium montanate available from Clariant (Japan) K.K. under the brand name "Licomont CAV 102".

<Preparation of Pellets and Specimens>

The polyamide resins described above and the ingredients indicated above were weighed in the proportions (parts by mass) described in Table 2 below, and the components excluding the glass fiber were first mixed in a tumbler. The resulting mixture was thrown into the hopper of a twin-screw extruder (available from Toshiba Machine Co., Ltd., model: TEM35B) and kneaded at a cylinder temperature controlled at the melting point of each polyamide resin plus 30° C. and the glass fiber was added from a side feed inlet to prepare pellets.

The resulting pellets were dried with dehumidified air (dew point −40° C.) at 80° C. for 8 hrs, and then processed in an injection molding machine (available from FANUC CORPORATION, model: 100T) at a temperature of the melting point of each polyamide resin plus 30° C. to prepare specimens (ISO specimens having a thickness of 4 mm).

(1) Flexural Strength (Expressed in MPa)
The specimens obtained were subjected to heat treatment (crystallization treatment) and tested for flexural strength (MPa) according to JIS K7171.

(2) Tensile Elongation
The specimens obtained were subjected to heat treatment (crystallization treatment) and tested for tensile elongation according to JIS K7113.

The results are shown in Table 2.

TABLE 2

| | | Example 8 | Example 9 | Comparative example 5 |
|---|---|---|---|---|
| Polyamide resin-4 | parts by mass | | 100 | |
| Polyamide resin-5 | parts by mass | 100 | | |
| Polyamide resin-10 | parts by mass | | | 100 |
| EL1 | parts by mass | | 5 | |
| EL2 | parts by mass | 9.1 | | 9.1 |
| Glass fiber | parts by mass | 73 | | 73 |
| Release agent | parts by mass | 0.55 | 0.55 | 0.55 |
| Flexural strength | Mpa | 290 | 285 | 150 |
| Elongation | % | 3.1 | 3.0 | 1.6 |

As shown in the foregoing examples, it was found that the reactive polyamide resins of the present invention have excellent elastic modulus and flexibility and that resin compositions containing such a polyamide resin and an elastomer have excellent impact resistance.

INDUSTRIAL APPLICABILITY

The polyamide resins of the present invention are highly reactive with elastomers and molded articles obtained by using resin compositions comprising such a resin and an elastomer are excellent in impact resistance, flexibility and adhesion to metals as well as heat resistance, strength and various mechanical properties so that they can be conveniently used as injection moldings, films, sheets, tubes, hoses, threads, fibers and the like in various applications including films, sheets, laminated films, laminated sheets, tubes, hoses, pipes, various containers such as hollow containers and bottles, domestic goods, industrial resources, industrial materials, electric/electronic equipment parts, parts of vehicles such as automobiles, general machine parts, precision machine parts and the like, and therefore, they will find wide industrial applicability.

The invention claimed is:

1. A polyamide resin composition, comprising:
a reactive polyamide resin; and
0.5 to 100 parts by mass of an elastomer per 100 parts by mass of the reactive polyamide resin,
wherein the reactive polyamide resin is obtained by polycondensing a diamine and a dicarboxylic acid, the diamine comprises 70 mol % or more of a diamine structural unit derived from a xylylenediamine, the dicarboxylic acid comprises 50 mol % or more of a dicarboxylic acid structural unit derived from sebacic acid,
the reactive polyamide resin has reactive functional groups at a concentration of 100 μeq/g or more, the reactive functional groups are a carboxylic acid and an amino group, the reactive polyamide resin has an amino group concentration of 50 μeq/g or more, the reactive polyamide resin has a molar ratio of reacted diamine to reacted dicarboxylic acid, which is the number of moles of the reacted diamine with respect to the number of moles of the reacted dicarboxylic acid, of 1.0 or more, and the polyamide resin composition is free from polyester resins other than polyester elastomers and aromatic crystalline polyester resin fillers.

2. The polyamide resin composition according to claim 1, wherein the elastomer is at least one selected from the group consisting of a polyolefin elastomer, a diene elastomer, a polystyrene elastomer, a polyamide elastomer, a polyester elastomer, a polyurethane elastomer, and a silicone elastomer.

3. The polyamide resin composition according to claim 1, wherein the elastomer is included in an amount of 1 to 50 parts by mass per 100 parts by mass of the reactive polyamide resin.

4. The polyamide resin composition according to claim 1, wherein the elastomer is included in an amount of 3 to 30 parts by mass per 100 parts by mass of the reactive polyamide resin.

5. The reactive polyamide resin composition according to claim 1, wherein the reactive functional groups are located at ends of the polyamide resin.

6. The reactive polyamide resin composition according to claim 5, wherein the reactive polyamide resin has a number average molecular weight of 20,000 or less.

7. The reactive polyamide resin composition according to claim 5, wherein the xylylenediamine is m-xylylenediamine or p-xylylenediamine.

8. The reactive polyamide resin composition according to claim 5, wherein the xylylenediamine is a mixture of m-xylylenediamine and p-xylylenediamine.

9. The reactive polyamide resin composition according to claim 1, wherein the reactive polyamide resin has a number average molecular weight of 20,000 or less.

10. The reactive polyamide resin composition according to claim 1, wherein the xylylenediamine is m-xylylenediamine or p-xylylenediamine.

11. The reactive polyamide resin composition according to claim 1, wherein the xylylenediamine is a mixture of m-xylylenediamine and p-xylylenediamine.

12. The reactive polyamide resin composition according to claim 1, wherein the molar ratio of the reacted diamine to the reacted dicarboxylic acid in the reactive polyamide resin is not less than 1.0 and not more than 1.015.

13. The reactive polyamide resin composition according to claim 1, wherein the molar ratio of the reacted diamine to the reacted dicarboxylic acid in the reactive polyamide resin is 1.001 or more.

* * * * *